Dec. 7, 1954  R. E. CURRAN  2,696,236
LOCK NUT ASSEMBLY
Filed Oct. 17, 1951
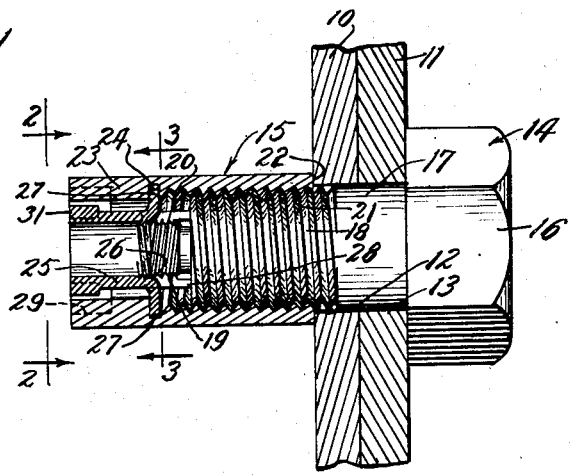
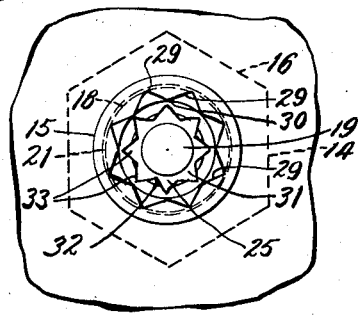
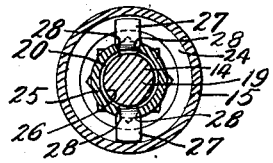
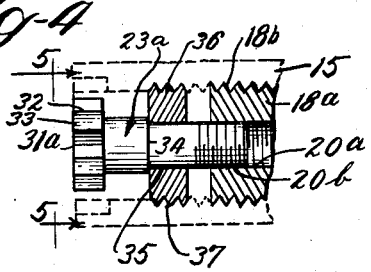
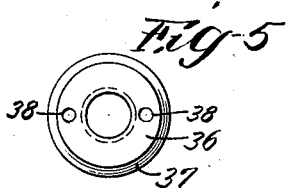
INVENTOR.
Russell E. Curran
BY
Robert H. W Tendt
Atty.

United States Patent Office 2,696,236
Patented Dec. 7, 1954

2,696,236

LOCK NUT ASSEMBLY

Russell E. Curran, Chicago, Ill.

Application October 17, 1951, Serial No. 251,795

2 Claims. (Cl. 151—16)

The present invention relates to improvements in lock nut assemblies, and is particularly concerned with the provision of an improved lock nut assembly in which all of the parts are protected and which may be used repeatedly without damage to its parts.

One of the objects of the invention is the provision of an improved lock nut assembly in which the nut or threaded member cooperating with the bolt is locked in place by means of opposite threads, such as for example, left-hand threads when the bolt has right-hand threads.

Another object of the invention is the provision of an improved lock nut construction in which the threads and lock nut are enclosed and protected against the weather so that corrosion is avoided, and the lock nut may be released at any time with a minimum amount of labor and it may be used over and over again.

Another object of the invention is the provision of an improved lock nut construction which is so constructed that it cannot be released except by persons having knowledge of its characteristics and of its mode of release, so that unauthorized persons cannot readily unlock the lock nut.

Another object of the invention is the provision of an improved lock nut assembly which is sturdy, simple in construction, which has a minimum number of parts, and which may be manufactured at a low cost.

Other objects and advantages of the invention will be apparent from the following description and the accompanying drawings, in which similar characters of reference indicate similar parts throughout the several views.

Referring to the single sheet of drawings accompanying the specification,

Fig. 1 is an axial, sectional view of a bolt and lock nut assembly embodying the invention;

Fig. 2 is a fragmentary end elevational view taken on the plane of the line 2—2 of Fig. 1;

Fig. 3 is a sectional view taken on the plane of the line 3—3 of Fig. 1;

Fig. 4 is a fragmentary, sectional view similar to Fig. 1, showing a modification;

Fig. 5 is an end elevational view taken on the plane of the line 5—5 of Fig. 4, looking in the direction of the arrows, showing only the nut 36.

Referring to Figures 1 to 3, 10 and 11 indicate two members to be secured together by the bolt and lock nut assembly, these members being metal plates provided with registering bores 12 and 13.

The assembly preferably includes a pair of threaded members, such as the bolt 14 and nut or threaded sleeve 15. The bolt has a head 16 which may be any suitable noncircular form, such as hexagonal, and it has a cylindrical shank 17 provided with a threaded portion 18, preferably having right-hand threads.

The shank 17 is provided with an integral extension 19 of reduced diameter provided with threads 20 extending in the opposite direction to the threads 18, that is, the threads 20 are left hand when the threads 18 are right hand and vice versa.

The sleeve 15, acting as a nut, comprises a tubular metal member provided with internal right-hand threads 21 and with a plane end 22 engaging the plate 10. Sleeve 15 has its threads extending over a distance sufficient to cover the threaded portion 18 and thereafter may be unthreaded and provided with a thicker wall portion 23, having an annular, rectangular groove 24.

The reduced threaded portion 20 having left-hand threads is adapted to receive a locking member 25, which may consist of a tubular metal member having internal left-hand threads 26 to be threaded on the reduced portion 20. The locking member 25 may have a pair of integral tabs or flanges 27 formed by slitting longitudinally at 28 and bending the portion between two slits outward at right angles to extend into the annular slot 24.

The threaded member 15, which is to be locked, has its thicker end portion 23 formed with V-grooves 29, Figure 2, extending outward into the thicker body 23, and presenting V-teeth 30 which are visible at the end of the assembly.

The apices of the teeth 30 are preferably spaced from the inner sleeve 25. The inner sleeve 25 has a thickened end portion 31 which is also provided with V-shaped grooves 32 forming V-shaped teeth 33 which are spaced from the teeth 30.

The two end portions 23 and 31 of the two sleeves may have the same number of teeth, or if desired one of them may have a larger number of teeth.

In order to move the two sleeves relative to each other a relatively narrow screw driver can be placed in the grooves 29 and 32 and twisted, which will cause the sleeve 25 to rotate relative to the sleeve 15.

The operation of this type of lock nut assembly is as follows:

The threaded member 15, which is equivalent to a nut, is threaded on the threaded portion 18 of the shank in a right-hand direction until the sleeve 25 comes into engagement with the end of the threads 20 on the reduced extension 19.

Thereafter it is necessary to turn the sleeve 25 in a counterclockwise direction while at the same time turning the sleeve 15 in a clockwise direction. This can be done by using the screw driver in the grooves 29 and 32 and the twisting of the screw driver will cause the sleeve 15 to progress toward the right while the sleeve 25 progresses toward the left.

During this time the lugs 27 rotate in the slot 24, and the action is continued until threaded member 15 clamps the plates 10 and 11 between surface 22 and head 16.

Referring to Figures 4 and 5, these are views showing a modification. In this case the threaded shank 18a does not have a reduced threaded extension but is provided with a threaded bore 20a extending axially into its end. When the threads 18b are right hand on the outside of the shank, the internal threads 20a are left hand.

The threaded bore 20a is adapted to cooperate with complementary left-hand threads 20b on a screw bolt 23a, which has a head 31a provided with the V-shaped grooves and ridges 32, 33, previously described.

The bolt 23a has an annular shoulder 34 and a smooth shank 35, and a threaded cylindrical jam nut 36 provided with right-hand threads 37.

The operation of this type of lock nut assembly is as follows:

The external sleeve or threaded member 15, which is to be locked, may be threaded on the threaded shank 18a of the bolt until the threaded portion 20b of bolt 23a comes to the bore 20a. The jam nut 36 preferably has oppositely located apertures 38, by means of which it may be threaded into sleeve 15, until it is located at such a position that it may be engaged by the shoulder 34 of the bolt 23a.

Bolt 23a may be turned by means of a screw driver in one direction, while the sleeve 15 is turned in the opposite direction until sleeve 15 clamps the plates and shoulder 34 engages jam nut 36 to hold the sleeve 15 in its locked position.

At any time the lock nut may again be released by inserting a screw driver in the grooves 29 and 32 and twisting.

It will thus be observed that the present lock nut assembly requires a special "know-how" on the part of the user so that it can only be manipulated by those who are familiar with its characteristics, which may not be known to unauthorized persons.

The lock nut assembly covers and protects all of the threads against the weather and corrosion, and the member 15 is locked against reverse rotation by means of the clamping action of the bolt 23a, which is threaded in an opposite direction and which would tend to become tighter if turned with the threaded member 15.

The present lock nut assemblies may be used over and over again without damaging them and without damaging the threads.

The assembly includes a minimum number of parts and may be manufactured economically.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a lock nut assembly of the type including a pair of metal members secured together by means of a bolt having a head and a threaded shank, the improvement which comprises a tubular metal member having a through bore provided with internal threads at one end complementary to said shank for threading on said shank to clamp said metal members between said head and tubular member, said tubular member extending beyond the end of said shank, said shank also having an extended part of reduced diameter at its end provided with threads running in the opposite direction from the threads on said shank, and said through bore being provided with an internal annular groove located at the inner end of its first-mentioned threads, and a second tubular locking member having internal threads extending in said opposite direction and receivable inside said first tubular member in threaded engagement with the opposite threads on the extended part of said shank, said second tubular member having a pair of radially extending integral lugs turned outward from its body and extending into said annular groove for sliding engagement to mount said locking member for rotation in said first-mentioned tubular member, said locking member progressing on said opposite threads by rotating in said first-mentioned tubular member until said lugs bind in said groove to lock said first-mentioned tubular member against back rotation, said locking tubular member terminating at or inwardly of the unthreaded end of the first tubular member, the first-mentioned tubular member having internal teeth with spaces between them and the locking tubular member having adjacent external teeth with spaces between them, the external teeth clearing the internal teeth for relative rotation, and said spaces receiving the end of a screw driver which may be twisted against adjacent external and internal teeth to rotate the tubular members simultaneously in opposite directions until the first-mentioned tubular member clamps said metal members, and the second-mentioned tubular member locks the first-mentioned tubular member by said lugs binding in said groove.

2. In a lock nut assembly of the type including a pair of metal members secured together by means of a bolt having a head and a threaded shank, the improvement which comprises a tubular metal member having a through bore provided with internal threads at one end complementary to said shank for threading on said shank to clamp said metal members between said head and tubular member, said tubular member extending beyond the end of said shank, said shank also having an extended part of reduced diameter at its end provided with threads running in the opposite direction from the threads on said shank, and said through bore being provided with an internal annular groove located at the inner end of its first-mentioned threads, and a second tubular locking member having internal threads extending in said opposite direction and receivable inside said first tubular member in threaded engagement with the opposite threads on the extended part of said shank, said second tubular member having a pair of radially extending integral lugs turned outward from its body and extending into said annular groove for sliding engagement to mount said locking member for rotation in said first-mentioned tubular member, said locking member progressing on said opposite threads by rotating in said first-mentioned tubular member until said lugs bind in said groove to lock said first-mentioned tubular member against back rotation, said locking tubular member terminating at or inwardly of the unthreaded end of the first tubular member, the first-mentioned tubular member having internal teeth with spaces between them and the locking tubular member having adjacent external teeth with spaces between them, the external teeth clearing the internal teeth for relative rotation, and said spaces receiving the end of a screw driver which may be twisted against adjacent external and internal teeth to rotate the tubular members simultaneously in opposite directions until the first-mentioned tubular member clamps said metal members, and the second-mentioned tubular member locks the first-mentioned tubular member by said lugs binding in said groove, the said internal and external teeth being formed by two diagonally extending surfaces like the apex of a triangle and the said spaces being of similar shape, said opposite threads on said shank being carried by a reduced portion for extending into said locking member.

References Cited in the file of this patent

UNITED STATES PATENTS

| Number | Name | Date |
|---|---|---|
| 299,308 | Williams | May 27, 1884 |
| 522,888 | French | July 10, 1894 |
| 620,597 | Ludeling | Mar. 7, 1899 |
| 1,123,531 | Herzberg | Jan. 5, 1915 |
| 1,290,357 | Rissler | Jan. 7, 1919 |